US008545920B2

(12) United States Patent
Medo et al.

(10) Patent No.: US 8,545,920 B2
(45) Date of Patent: Oct. 1, 2013

(54) HUMAN MILK COMPOSITIONS AND METHODS OF MAKING AND USING SAME

(75) Inventors: Elena M. Medo, Murrieta, CA (US); Martin L. Lee, Studio City, CA (US); David J. Rechtman, Hermosa Beach, CA (US); Joseph Fournell, Newbury Park, CA (US)

(73) Assignee: Prolacta Bioscience Inc., City of Industry, CA (US)

( * ) Notice: Subject to any disclaimer, the term of this patent is extended or adjusted under 35 U.S.C. 154(b) by 936 days.

(21) Appl. No.: 11/947,580

(22) Filed: Nov. 29, 2007

(65) Prior Publication Data

US 2008/0124430 A1    May 29, 2008

Related U.S. Application Data

(60) Provisional application No. 60/867,748, filed on Nov. 29, 2006, provisional application No. 60/841,371, filed on Aug. 30, 2006.

(51) Int. Cl.
*A23C 9/158* (2006.01)
*A23C 9/152* (2006.01)
*A23C 9/20* (2006.01)
*A23L 1/30* (2006.01)
*A23L 1/302* (2006.01)

(52) U.S. Cl.
CPC . *A23C 9/206* (2013.01); *A23L 1/30* (2013.01); *A23L 1/302* (2013.01)
USPC ............................................ 426/580; 426/74

(58) Field of Classification Search
CPC ............. A23C 9/206; A23I 1/296; A23I 1/30; A23I 1/302; A23I 1/304; A23I 1/3056; A23I 2/52; A23I 2/66
USPC .................................................. 426/74, 580
See application file for complete search history.

(56) References Cited

U.S. PATENT DOCUMENTS

| | | | |
|---|---|---|---|
| 2,567,898 A | 9/1951 | Staaff | |
| 3,946,113 A | 3/1976 | Seiberling | |
| 4,362,697 A | 12/1982 | Tabb et al. | |
| 4,455,483 A | 6/1984 | Schonhuber | |
| 4,762,822 A | 8/1988 | Ettinger | |

(Continued)

FOREIGN PATENT DOCUMENTS

| | | |
|---|---|---|
| EP | 1637043 | 3/2006 |
| GB | 1451747 A | 10/1976 |

(Continued)

OTHER PUBLICATIONS

Polberger, S.K.T., et al. (Growth of very low birth weight infants on varying amounts of human milk protein) Ped. Res. 25 (1989) 414-419.*

(Continued)

*Primary Examiner* — D. Lawrence Tarazano
*Assistant Examiner* — Jerry W Anderson
(74) *Attorney, Agent, or Firm* — Cooley LLP

(57) ABSTRACT

The disclosure features human milk fortifier compositions, standardized human milk, and methods of making and using same. In one embodiment, a pasteurized human milk composition includes a human protein constituent of about 35-85 mg/mL; a human fat constituent of about 60-110 mg/mL; and a human carbohydrate constituent of about 60-140 mg/mL.

5 Claims, 2 Drawing Sheets

(56) References Cited

U.S. PATENT DOCUMENTS

| | | |
|---|---|---|
| 4,772,262 A | 9/1988 | Grant et al. |
| 4,876,100 A | 10/1989 | Holm et al. |
| 4,948,599 A | 8/1990 | Sagara et al. |
| 5,064,674 A | 11/1991 | Girsh |
| 5,169,766 A | 12/1992 | Schuster et al. |
| 5,256,437 A | 10/1993 | Degen et al. |
| 5,303,598 A | 4/1994 | Binder |
| 5,334,822 A | 8/1994 | Sanford |
| 5,401,523 A | 3/1995 | Degen et al. |
| 5,505,955 A | 4/1996 | Peterson et al. |
| 5,541,065 A | 7/1996 | Erlich et al. |
| 5,576,040 A | 11/1996 | Moller et al. |
| 5,605,689 A | 2/1997 | Ammann |
| 5,616,483 A | 4/1997 | Bjursell et al. |
| 5,670,196 A | 9/1997 | Gregory |
| 5,683,733 A | 11/1997 | Krabsen et al. |
| 5,707,678 A | 1/1998 | Gregory |
| 5,972,337 A | 10/1999 | Ceriani et al. |
| 5,983,198 A | 11/1999 | Mowery |
| 6,004,288 A | 12/1999 | Hochstedler et al. |
| 6,017,511 A | 1/2000 | Wong et al. |
| 6,020,015 A | 2/2000 | Gaull |
| 6,056,978 A | 5/2000 | Beck et al. |
| 6,183,803 B1 | 2/2001 | Morcol et al. |
| 6,194,009 B1 | 2/2001 | Kamarel |
| 6,270,827 B1 | 8/2001 | Gaull et al. |
| 6,294,206 B1 | 9/2001 | Barrett-Reis et al. |
| 6,613,367 B1 | 9/2003 | Wells et al. |
| 6,635,296 B1 | 10/2003 | Nissen et al. |
| 6,652,900 B2 | 11/2003 | Lindquist |
| 6,670,124 B1 | 12/2003 | Chow et al. |
| 6,737,096 B2 | 5/2004 | Lindquist |
| 6,780,987 B1 | 8/2004 | Herman et al. |
| 6,846,298 B1 | 1/2005 | Carr et al. |
| 6,910,594 B2 | 6/2005 | Foley et al. |
| 7,867,541 B2 | 1/2011 | McMahon et al. |
| 7,914,822 B2 | 3/2011 | Medo |
| 7,943,315 B2 | 5/2011 | Medo et al. |
| 7,951,410 B2 | 5/2011 | McMahon et al. |
| 8,278,046 B2 | 10/2012 | Medo et al. |
| 2001/0034614 A1 | 10/2001 | Fletcher-Haynes et al. |
| 2001/0049096 A1 | 12/2001 | Brown |
| 2002/0155445 A1 | 10/2002 | Jarvik |
| 2002/0182243 A1* | 12/2002 | Medo .................. 424/439 |
| 2003/0093171 A1 | 5/2003 | Soehnlen |
| 2003/0152942 A1 | 8/2003 | Fors et al. |
| 2003/0175701 A1 | 9/2003 | Griffiths et al. |
| 2003/0219812 A1 | 11/2003 | Quay et al. |
| 2004/0181205 A1 | 9/2004 | Morton et al. |
| 2004/0265462 A1 | 12/2004 | Carlson |
| 2005/0053707 A1 | 3/2005 | Kopf et al. |
| 2005/0096295 A1 | 5/2005 | McMahon et al. |
| 2005/0100634 A1 | 5/2005 | Medo |
| 2005/0214358 A1 | 9/2005 | Mikoshiba et al. |
| 2005/0220894 A1 | 10/2005 | Williams et al. |
| 2006/0115558 A1 | 6/2006 | Lamothe |
| 2006/0204632 A1 | 9/2006 | Barrett-Reis et al. |
| 2006/0233915 A1 | 10/2006 | Puski et al. |
| 2007/0098863 A1 | 5/2007 | Medo et al. |
| 2007/0104700 A1 | 5/2007 | Garcia-Rodenas et al. |
| 2007/0203802 A1 | 8/2007 | Medo et al. |
| 2008/0118615 A1 | 5/2008 | Hartmann et al. |
| 2008/0187619 A1 | 8/2008 | Hartmann et al. |
| 2008/0227101 A1 | 9/2008 | Medo et al. |
| 2008/0254165 A1 | 10/2008 | Patel et al. |
| 2008/0274230 A1 | 11/2008 | Johns et al. |
| 2009/0181848 A1 | 7/2009 | Lenz et al. |
| 2009/0203592 A1 | 8/2009 | Beermann et al. |
| 2009/0258121 A1 | 10/2009 | Medo |
| 2010/0268658 A1 | 10/2010 | Medo et al. |
| 2010/0280115 A1 | 11/2010 | Medo et al. |
| 2011/0206684 A1 | 8/2011 | Medo |
| 2011/0311689 A1 | 12/2011 | Medo et al. |

FOREIGN PATENT DOCUMENTS

| | | |
|---|---|---|
| JP | 61-33895 U | 1/1986 |
| JP | 64-67141 A | 3/1989 |
| JP | 6-303900 A | 11/1994 |
| JP | 2002-532074 A | 10/2002 |
| JP | 2002-540806 A | 12/2002 |
| JP | 2005-525116 A | 8/2005 |
| SE | 380422 B | 11/1975 |
| WO | WO 9857549 | 12/1998 |
| WO | WO-00/43550 | 7/2000 |
| WO | WO 2005/013709 A1 | 2/2005 |
| WO | WO 2005/051088 A2 | 6/2005 |
| WO | WO 2005/084129 A2 | 9/2005 |
| WO | WO 2006/026878 A1 | 3/2006 |
| WO | WO 2006/026879 A1 | 3/2006 |
| WO | WO/2007/035870 | 3/2007 |
| WO | WO-25008/027572 | 3/2008 |
| WO | WO-2008/067486 | 6/2008 |
| WO | WO-2008/073888 | 6/2008 |
| WO | WO 2010/030764 A2 | 3/2010 |

OTHER PUBLICATIONS

Klein, C. J., Ed. (Nutrient requirements for preterm infant formulas) The J. of Nutr. 132(4) (2001, 1395S-1549S.*

Davies, D. P., "Adequacy of Expressed Breast Milk for Early Growth of Preterm Infants," Arch. Disease in Childhood. 1977. vol. 52, pp. 296-301.

Hagelberg S., et al., "Amino Acid Levels in the Critically Ill Preterm Infant Given Mother's Milk Fortified with Protein from Human or Cow's Milk" Acta Paediatr Scan.1990. vol. 79, pp. 1163-1174.

Hagelberg, S., et al., "The Protein Tolerance of Very Low Birth Weight Infants Fed Human Milk Protein Enriched Mothers' Milk" Acta Paediatr Scan. 1982. vol. 71, pp. 597-601.

Hylmo, P., et al., "Preparation of Fat and Protein from Banked Human Milk: Its Use in Feeding Very-Low-Birth-Weight Infants," Human Milk Banking, edited by A.F. Williams and J.D. Baum, Nestle Nutrition, Vewey/Raven Press, New York, 1984, pp. 55-61.

Lindblad B.S., et al., "Blood Levels of Critical Amino Acids in Very Low Birthweight Infants on a High Human Milk Protein Intake" Acta Paediatr Scan.1982.vol. 296, pp. 24-27.

Moro, G.E., et al., "Growth and Metabolic Responses in Low-Birth-Weight Infants Fed Human Milk Fortified with Human Milk Protein or with a Bovine Milk Protein Preparation," J. Pediatric Gastroenterol. and Nutr. 1991. vol. 13, pp. 150-154.

Polberger, S.K.T., "Fortified Human Milk for Very Low Birth Weight Infants: Effects on Growth and Metabolism," Dept. Pediatrics, University of Lund, Malmo 1990, pp. 1-148.

Polberger, S.K.T., et al., "Amino Acid Concentrations in Plasma and Urine in Very Low Birth Weight Infants Fed Non-Protein-Enriched or Human Milk Protein-Enriched Human Milk," Department of Pediatrics, University of Lund, Malmö General Hospital, S-21401 Malmö Sweden, pp. 131-148. Pediatrics 1990; 86: 909-915.

Polberger, S.K.T., et al., "Assessment of Eleven Different Plasma Proteins as Indicators of Protein Nutritional Status in Very Low Birth Weight Infants," Department of Pediatrics, University of Lund, Malmö General Hospital, S-21401 Malmö Sweden, 1990, pp. 115-129.

Polberger, S.K.T., et al., "Concentrations of Twelve Plasma Proteins at Birth in Very Low Birth Weight and in Term Infants," Department of Pediatrics, University of Lund, Malmö General Hospital, S-21401 Malmö Sweden, pp. 101-114. Acta Paediatr Scand. 1990; 79(8-9): 729-736.

Polberger, S.K.T., et al., "Growth of Very Low Birth Weight Infants on Varying Amounts of Human Milk Protein," Department of Pediatrics, University of Lund, Malmö General Hospital, S-21401 Malmö Sweden, pp. 69-87. Pediatr Res 1989; 25: 414-419.

Polberger, S.K.T., et al., "Urinary and Serum Urea as Indicators of Protein Metabolism in Very Low Birth Weight Infants Fed Varying Human Milk Protein Intakes," Department of Pediatrics, University of Lund, Malmö General Hospital, S-21401 Malmö Sweden, pp. 89-99. Acta Paediatr Scand. 1990; 79(8-9): 737-42.

Ronnholm, K., et al., "Supplementation with Human Milk Protein Improves Growth of Small Premature Infants Fed Human Milk," Pediatrics. 1986. vol. 77, No. 5, pp. 649-653.

Schanler, R., et al., "Enhanced Fecal Excretion of Seleted Immune Factors in Very Low Birth Weight Infants Fed Fortified Human Milk," Pediatric Research. 1986. vol. 20, No. 8, pp. 711-715.

Schanler, R., et al., "Fortified Mothers' Milk for Very Low Birth Weight Infants; Results of Growth and Nutrient Balance Studies," J. Pediatrics. 1985. vol. 107, No. 3, pp. 437-444.

Schanler, R., et al., "Fortified Mothers' Milk for Very Low Birth Weight Infants: Results in Macromineral Balance Studies," J. Pediatrics. 1985. vol. 107, No. 5, pp. 767-774.

Schanler, R., et al., "Mineral Balance Studies in Very Low Birth Weight Infants Fed Human Milk," J. Pediatrics. 1988. vol. 113, vol. 1, Part 2, pp. 230-238.

Srinivasan, L., et al., "Increased Osmolality of Breast Milk with Therapeutic Additives," Arch Dis Child Fetal Neonatal Ed. 2004. 89:F514-17.

Terpstra, et al., "Antimicrobial and Antiviral Effect of High-Temperature Short-Time (HTST) Pasteurization Applied to Human Milk," Breastfeeding Med. 2007. vol. 2, pp. 27-33.

Virus Safety Services, Sanquin Research, Final Report FR4500, "Process Validation Breast Milk Step 1 for Inactivation of BVDV/HAV/HIV/PSR," May 27, 2002. pp. 1-33.

Voyer, M., et al. "Human Milk Lacto-Engineering," Acta Paediatr Scan. 1984. vol. 73, pp. 302-306.

International Search Report and Written Opinion for PCT/US07/19234, Mar. 6, 2008, Prolacta Bioscience, Inc.

Arnold, "How North American Donor Banks Operate: Results of a Survey: Part 2," J. Hum. Lact., 13(3):243-46, Sep. 1997.

Bernshaw N.J., "Milk Banking: An Idea That Has Come of Age. Non-Profit Milk Banking," Seminar delivered at Utah Breastfeeding Coalition Meeting, Aug. 29, 2006.

The Dairy Council, "The Nutritional Composition of Dairy Products," pp. 1-49, 2002.

Prentice A., "Constituents of Human Milk," Food and Nutrition Bulletin, The United Nations University Press, 17(4), Dec. 1996.

PCT/US07/85969 International Search Report and Written Opinion, Prolacta Bioscience, Inc.

PCT/US07/86973 International Search Report and Written Opinion, Prolacta Bioscience, Inc.

Jenness and Palmer, "Substances Adsorbed on the Fat Globules in Cream and Their Relation to Churning. V. Composition of the 'Membrane' and Distribution of the Adsorbed Substances in Churning," J. Dairy Science 28(8):611-23, 1945.

Jensen et al., "Lipids of Bovine and Human Milks: A Comparison," J. Dairy Science 73:223-40, 1990.

Krukovsky et al., "The Effects of Nordihydroguaiaretic Acid, Salt, and Temperature of Storage on the Stability of Fat and Fat-Soluble Vitamins in Cream and Butter," J. Dairy Science 32(7):679:87, 1949.

PCT/US06/36827 International Search Report and Written Opinion, Prolacta Bioscience, Inc., et al.

Burger and Schumm, "Detection of a Minor contributor in a DNA Sample Mixture from Human Milk," International Congress Series, 1288:547-549, 2006.

Hartmann, B.T., et al. "Best Practice Guidelines for the Operation of a Donor Human Milk Bank in an Australian NICU," Early Human Devel. 83:667-673, 2007.

Boehm, G., et al., "Metabolic Differences Between AGA- and SGA-Infants of Very Low Birthweight II Relationship to Protein Intake," Acta Paediatrica Scaninavica, Almqvist, Och Wiksell, Stockholm, SE, vol. 77, No. 5, Jan. 1, 1988, pp. 642-646.

Roennholm, K.A.R., et al., "Human Milk Protein and Medium-Chain Triglyceride Oil Supplementation of Human Milk: Plasma Amino Acids in Very Low-Birth-Weight Infants," Pediatrics, American Academy of Pediatrics, Evanston, IL, vol. 74, No. 5, Jan. 1, 1984, pp. 792-799.

Klein, Catherine J., "Nutrient Requirements for Preterm Infant Formulas," J. Nutr. 132:1395S-1577S, 2002.

Arnold, "How North American Donor Banks Operate: Results of a Survey: Part 1," J. Hum. Lact. 13(2):159-162 (1997).

Arnold, "How to Order Banked Donor Milk in the United States: What the Health Care Provider Needs to Know," J. Hum. Lact. 14(1):65-67 (1998).

Burger et al., "Detection of a 1& to 2% Contributor in a DNA Sample Mixture From Human Milk," International Society for Forensic Genetics 21$^{st}$ Congress Conference Programme and Abstracts [online], Sep. 12-17, 2005 [retrieved on Mar. 26, 2007]. Retrieved from the Internet: http://www.ipatimup.pt/isfg2005/PROGRAMME.pdf; p. 75.

Carey et al., "Growth and phosphorus metabolism in premature infants fed human milk, fortified human milk, or special premature formula. Use of serum procollagen as a marker of growth," Am. J. Dis. Children 141(5):511-515 (1987).

Casey, "The nutritive and metabolic advantages of homologous milk," Proc. Nutr. Soc. 48:271-281 (1989).

Friis and Andersen, "Rate of inactivation of cytomegalovirus in raw banked milk during storage at—20° C. and pasteurisation," Br. Med. J. 285:1604-1605 (1982).

Fukushima et al., "Consumption of cow milk and egg by lactating women and the presence of β-lactoglobulin and ovalbumin in breast milk," Am. J. Clin. Nutr. 65:30-35 (1997).

Gartner et al., "Breastfeeding and the use of human milk," Pediatr. 115(2):496-506 (2005).

Itabashi et al., "Fortified preterm human milk for very low birth weight infants," Early Hum. Devel. 29:339-343 (1992).

Jensen et al., "Lipids in Human Milk and Infant Formulas," Ann. Rev. Nutr. 12:417-441 (1992).

Lawrence, "Storage of human milk and the influence of procedures on immunological components of human milk," Acta Pædiatr. 88:14-18 (1999).

Lönnerdal, "Biochemistry and physiological function of human milk proteins," Am. J. Clin. Nutr. 42:1299-1317 (1985).

Lucas et al., "A human milk formula," Early Hum. Devel. 4/1:15-21 (1980).

McKiernan and Hull, "The Constituents of Neonatal Milk," Pediatr. Res. 16:60-64 (1982).

Moro et al., "Fortification of Human Milk: Evaluation of a Novel Fortification Scheme and of a New Fortifier," J. Ped. Gastroenterol. Nutr. 20:162-172 (1995).

Ogundele,"Techniques for the storage of human breast milk: implications for anti-microbial functions and safety of stored milk," Eur. J. Pediatr. 159:793-797 (2000).

Panzer et al., "Immune thrombocytopenia in severe hemophilia A treated with high-dose intravenous immunoglobulin," Transfusion 26:69-72 (1986).

Saiki et al., "Genetic analysis of amplified DNA with immobilized sequence-specific oligonucleotide probes," Proc. Natl. Acad. Sci. USA 86:6230-6234 (1989).

Schanler et al., "Feeding strategies for premature infants: beneficial outcomes of feeding fortified human milk versus preterm formula," Pediatr. 103(6 Pt 1):1150-1157 (1999).

Supplementary European Search Report mailed Apr. 20, 2011 in co-pending European application No. EP 07811645.6, 7 pages.

Supplementary European Search Report mailed Apr. 27, 2011 in co-pending European application No. EP 07864921.7, 8 pages.

Supplementary European Search Report mailed Mar. 24, 2009 in co-pending European application No. EP 06815100.0, 6 pages.

Supplementary European Search Report mailed Oct. 15, 2010 in co-pending European application No. EP 07865463.9, 6 pages.

Tully, "Is Pasteurized Mother's Own or Donor Milk an Answer to the HIV Crisis," J. Hum. Lact. 15(4):345-346 (1999).

Williams et al., "Human Milk Banking," J. Trop. Pediatr. 31:185-190 (1985).

Young, "International Search Report," and "Written Opinion of the International Searching Authority," 11 pages, from International Patent Application No. PCT/US09/66430, United States Patent and Trademark Office, Alexandria, Virginia, USA (mailed Jan. 26, 2010).

Arnold, "How North American Doner Banks Operate: Results of a Survey: Part 1," J. Hum. Lact. 13(2):159-162 (1997).

Arnold, "How to Order Banked Doner Milk in the United States: What the Health Care Provider Needs to Know," J. Hum. Lact. 14(1):65-67 (1998).

Burger et al., "Detection of a 1% to 2% Contributor in a DNA Sample Mixture From Human Milk," International Society for Forensic Genetics 21st Congress Conference Programme and Abstracts [online], Sep. 12-17, 2005 [retrieved on Mar. 26, 2007]. Retrieved from the Internet: http://www.ipatimup.pt/isfg2005/PROGRAMME.pdf; p. 75.

Carey et al., "Growth and phosphorus metabolism in premature infants fed human milk, fortified human milk, or special premature forumula. Use of serum procollagen as a marker of growth," Am. J. Dis. Children 141(5):511-515 (1987).

"International Search Report," 2 pages, PCT appl. No. PCT/US2012/049590 (mailed Oct. 1, 2012).

"Written Opinion of the International Searching Authority," 6 pages, PCT appl. No. PCT/US2012/049590 (mailed Oct. 1, 2012).

Cowan et al., "Milk permeate as a dietary supplement for lactating dairy cows," Aus. J. Exp. Agric. 30(6):807-810 (1990).

Geilman et al., "Production of an electrolyte beverage from milk permeate," J. Dairy Sci. 75(9):2364-2369 (1992).

Luck and Nau, "Nicotine and cotinine concentrations in the milk of smoking mothers: influence of cigarete consumption and diurnal variation," Eur J. Pediatr. 146:21-26 (1987).

Supplementary European Search Report mailed Oct. 29, 2012 in co-pending European application No. EP 09831061.8, 5 pages.

Lapillione, et al., "Mineral balance and whole body bone mineral content in very low-birth-weight infants", (1994) Acta Pediatrica 84 (s405):117-122.

Melegh, et al., "Changes of Plasma Free Amino Acids and Renal Clearances of Carnitines in Premature Infants During L-Carnitine-Supplemented Human Milk Feeding", (1998) J. Pediatric Gastroenterol. Nutr. 7(3):424-429.

Salle, et al., "Effects of Calcium and Phosphorus Supplementation on Calcium Retention and Fat Absorption in Preterm Infants Fed Pooled Human Milk", (1986) J. Pediatric Gastroenterol. Nutr. 5(4):638-642.

* cited by examiner

ID# 8,545,920 B2

HUMAN MILK COMPOSITIONS AND METHODS OF MAKING AND USING SAME

CROSS-REFERENCE TO RELATED APPLICATIONS

This application claims priority to provisional application 60/841,371 filed Aug. 30, 2006; provisional application 60/867,748, filed Nov. 29, 2006; and PCT application PCT/US07/19234, filed Aug. 30, 2007. The contents of these applications are incorporated herein by reference in their entireties.

TECHNICAL FIELD

The disclosure relates to human milk compositions, e.g., human milk fortifiers and standardized human milk formulations, and methods of making and using such compositions.

BACKGROUND

Human milk is generally the food of choice for preterm and term infants because of its nutritional composition and immunologic benefits. The source of human milk can be, e.g., a donor or the infant's mother. The nutritional value of raw or conventionally-processed donor milk, however, varies and, in most instances, is not sufficient to meet the needs of preterm infants. In addition, a possibility of bacterial, viral and other contamination of raw donor milk exists. For these and other reasons, use of milk from the infant's own mother has become the preferred nutritional approach in the modern neonatal intensive care units (NICUs). Even the mother's own milk, however, is not nutritionally sufficient for the premature infant. It is often desirable to feed preterm infants milk that is fortified with various supplements, e.g., proteins, added energy (calories) and/or minerals.

SUMMARY

This disclosure features human milk compositions, e.g., pasteurized human milk compositions, and methods of making and using such compositions. The compositions include human milk fortifiers (e.g., PROLACTPLUS™ Human Milk Fortifiers, e.g., PROLACT+4™, PROLACT+6™, PROLACT+8™, and/or PROLACT+10™), which are produced from human milk and contain various concentrations of nutritional components, e.g., protein, fat, carbohydrates, vitamins, and/or minerals. These fortifiers can be added to the milk of a nursing mother to provide an optimal nutritional content of the milk for, e.g., a preterm infant. Depending on the content of mother's own milk, various concentrations of the fortifiers can be added to mother's milk. For example, the protein concentration of the mother's milk can be increased with the use of the fortifier. As mentioned above, the fortifiers of the present disclosure are generated from human milk and, therefore, provide infants with human-derived nutrients.

The disclosure also features standardized human milk formulations (exemplified by PROLACT20™, NEO20™, and/or PROLACT24), which are produced from human milk. Methods of making and using such compositions are also described herein. These standardized human milk formulations can be used to feed, e.g., preterm infants, without mixing them with other fortifiers or milk. They provide a nutritional human-derived formulation and can substitute for mother's milk. Human milk formulations can contain various caloric contents, for example, PROLACT24™ (a full-feed whole milk product) can contain about 24 Cal/oz or about 81 Cal/100 mL.

The methods featured herein are used to process large volumes of donor milk, e.g., about 75-2,000 liters/lot of starting material.

In one aspect, the disclosure features a pasteurized human milk composition that includes: a human protein constituent of about 35-85 mg/mL; a human fat constituent of about 60-110 mg/mL; and a human carbohydrate constituent of about 60-140 mg/mL. The carbohydrate constituent can include lactose. The composition can further include IgA and/or one or more constituents selected from the group consisting of: calcium, chloride, copper, iron, magnesium, manganese, phosphorus, potassium, sodium, and zinc. In one embodiment, the composition can be mixed with raw human milk to provide a nutritional composition, wherein the raw human milk comprises about 80%, about 70%, about 60%, or about 50% of the nutritional composition.

Embodiments can include one or more of the following features.

In one embodiment, the composition can include the protein constituent of about 55-65 mg/mL; the fat constituent of about 85-95 mg/mL; and the carbohydrate constituent of about 70-120 mg/mL. The carbohydrate constituent can include lactose. The composition can further include IgA and/or one or more constituents selected from the group consisting of: calcium (e.g., at a concentration of about 4.0-5.5 mg/mL or at 2.00-2.90 mg/mL); chloride (e.g., at a concentration of about 0.35-0.95 mg/mL or at about 0.175-0.475 mg/mL); copper (e.g., at a concentration of about 0.0005-0.0021 mg/mL or at about 0.00025-0.001 mg/mL); iron (e.g., at a concentration of about 0.001-0.007 mg/mL or at about 0.0005-0.0025 mg/mL); magnesium (e.g., at a concentration of about 0.180-0.292 mg/mL or at about 0.090-0.170 mg/mL); manganese (e.g., at a concentration of about 0.010-0.092 mcg/mL or at about 0.005-0.046 mcg/mL;); phosphorus (e.g., at a concentration of about 2.00-3.05 mg/mL or at about 1.00-2.90 mg/mL, e.g., at about 1.00-1.50 mg/mL); potassium (e.g., at a concentration of about 1.90-2.18 mg/mL or at about 0.95-1.41 mg/mL); sodium (e.g., at a concentration of about 0.75-0.96 mg/mL or at about 0.375-0.608 mg/mL); and zinc (e.g., at a concentration of about 0.0200-0.0369 mg/mL or at about 0.010-0.0198 mg/mL). In one embodiment, the composition can be mixed with raw human milk to provide a nutritional composition, wherein the raw human milk comprises about 80%, about 70%, about 60%, or about 50% of the nutritional composition.

In another aspect, the disclosure features a pasteurized human milk composition that includes: a human protein constituent of about 11-20 mg/mL, e.g., about 11-13 mg/mL; a human fat constituent of about 35-55 mg/mL; and a human carbohydrate constituent of about 70-120 mg/mL, e.g., about 80-105 mg/mL. The carbohydrate constituent can include lactose. The caloric content of the composition can be about 0.64 to about 1.10 Cal/mL.

Embodiments can include one or more of the following features.

In one embodiment, the pasteurized human milk composition can further include one or more of the following components: calcium (e.g., at a concentration of about 0.40-1.50 mg/mL); chloride (e.g., at a concentration of about 0.30-0.80 mg/mL); copper (e.g., at a concentration of about 0.0005-0.0021 mg/mL); iron (e.g., at a concentration of about 0.001-0.005 mg/mL); magnesium (e.g., at a concentration of about 0.03-0.13 mg/mL); manganese (e.g., at a concentration of about 0.01-0.092 mcg/mL); phosphorus (e.g., at a concentration of about 0.15-0.631 mg/mL); potassium (e.g., at a concentration of about 0.60-1.20 mg/mL); sodium (e.g., at a concentration of about 0.20-0.60 mg/mL); and/or zinc (e.g., at a concentration of about 0.0025-0.0120 mg/mL).

The disclosure also features method of making various human milk compositions.

In one aspect, the disclosure features a method for obtaining a pasteurized human milk composition. The method includes: (a) genetically screening human milk for one or more viruses; (b) filtering the milk; (c) heat-treating the milk, e.g., at about 63° C. or greater for about 30 minutes; (d) separating the milk into cream and skim; (e) adding a portion of the cream to the skim; and (f) pasteurizing.

Embodiments include one or more of the following features.

In one embodiment, the method can further include filtering the skim through filters after step (d), e.g., to filter the water out of the skim. After filtering the skim after step (d), the filters used in the filtering can be washed to obtain a post wash solution. The post wash solution can be added to the skim.

The genetic screening in step (a) can be polymerase chain reaction and/or can include screening for one or more viruses, e.g., HIV-1, HBV, and/or HCV. The milk can be filtered through an about 200 micron screen in step (b). The method can further include running cream, e.g., about 30-50% of cream, through a separator following step (d). The composition of post wash and skim can include about 7.0-7.2% of protein.

The method can further include carrying out mineral analysis of the portion of the composition obtained after step (e). The method can also include adding to the composition obtained after step (e) one or more minerals selected from the group consisting of: calcium, chloride, copper, iron, magnesium, manganese, phosphorus, potassium, sodium, and zinc. Adding of the one or more minerals can include heating the composition.

The method can also include cooling the composition after step (f), carrying out biological testing of a portion of the composition after step (f), and/or carrying out nutritional testing of a portion of the composition after step (f).

The human milk of step (a) can be pooled human milk. The methods featured herein can be carried out with large volumes of the starting material, e.g., human milk, e.g., pooled human milk. The volumes can be in the range of about 75-2,000 liters/lot of starting material.

The composition obtained after step (f) can include about 8.5-9.5 fat, about 6.3-7.0 protein, and about 8.0-10.5% lactose.

In another aspect, the disclosure features a method for obtaining a pasteurized human milk composition. The method includes: (a) genetically screening human milk for one or more viruses; (b) filtering the milk; (c) adding cream; and (d) pasteurizing.

Embodiments can include one or more of the following features.

In one embodiment, the genetic screening in step (a) can be polymerase chain reaction. The genetic screening can include screening for one or more viruses, e.g., HIV-1, HBV, and/or HCV.

The milk can be filtered through an about 200 micron screen in step (b). The method can further include ultra filtering the whole milk after step (b) through filters. The filters used during ultra filtering can be post washed.

The composition can be cooled after step (d). Biological and/or nutritional testing of the composition can be carried out after step (d).

Human milk of step (a) can be pooled human milk. The methods featured herein can be carried out with large volumes of the starting material, e.g., human milk, e.g., pooled human milk. The volumes can be in the range of about 75-2,000 liters/lot of starting material.

The method can also include adding to the composition obtained after step (c) one or more minerals selected from the group consisting of: calcium, chloride, copper, iron, magnesium, manganese, phosphorus, potassium, sodium, and zinc. In one embodiment, the composition obtained after step (d) can include about 11-20 mg/mL protein, about 35-55 mg/mL fat, and about 70-120 mg/mL carbohydrates.

In another aspect, the disclosure features a kit that includes the pasteurized human milk compositions featured herein (e.g., a fortifier) and a graduated container (e.g., a bottle, a syringe, and a can) for mixing the featured compositions with raw human milk.

In yet another aspect, the disclosure features a method of obtaining a nutritional milk composition. The method includes adding the pasteurized human milk compositions featured herein (e.g., fortifiers) to raw human milk, thereby increasing the nutritional concentration of the raw human milk. The caloric composition of the raw human milk can be increased by about 2-10 Cal/oz.

In another aspect, the disclosure features a method of providing supplemental nutrients to a premature human infant, the method comprising adding the compositions (fortifiers) featured herein to raw human milk to obtain a mixture and administering the mixture to the premature infant.

The terms "premature", "preterm" and "low-birth-weight (LBW)" infants are used interchangeably and refer to infants born less than 37 weeks gestational age and/or with birth weights less than 2500 gm.

By "whole milk" is meant milk from which no fat has been removed.

By "bioburden" is meant microbiological contaminants and pathogens (generally living) that can be present in milk, e.g., viruses, bacteria, mold, fungus and the like.

All patents, patent applications, and references cited herein are incorporated in their entireties by reference.

DETAILED DESCRIPTION

Figure 1:
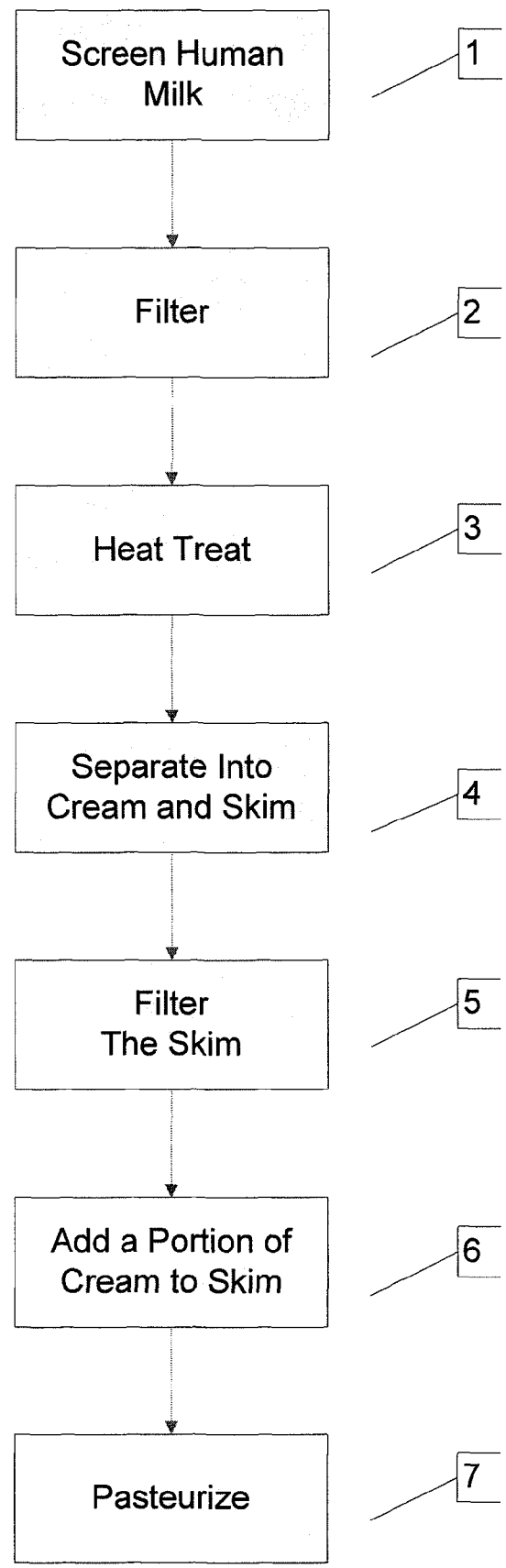
FIG. 1 is a chart of an embodiment of a method of making a human milk fortifier.

This disclosure features human milk compositions, e.g., pasteurized human milk compositions, and methods of making and using such compositions. The compositions include human milk fortifiers (e.g., PROLACTPLUS™ Human Milk Fortifiers, e.g., PROLACT+4™, PROLACT+6™, PROLACT+8™, and/or PROLACT+10™), which are produced from human milk and contain various concentrations of nutritional components, e.g., vitamins, and/or minerals. These fortifiers can be added to the milk of a nursing mother to provide an optimal nutritional content of the milk for, e.g., a preterm infant. Depending on the content of mother's own milk, various concentrations of the fortifiers can be added to mother's milk. For example, the protein concentration and/or caloric content of the mother's milk can be increased with the use of the fortifier. In one embodiment, the featured fortifiers can deliver from about 3.3 to about 5.5 g of protein/kg/day to the infant receiving a full feed of 150 mL and/or 3.2 to 4.1 grams of protein per 120 Cal/kg/day.

The disclosure also features standardized human milk formulations (exemplified by PROLACT20™, NEO20™, and/or PROLACT24™), which are produced from human milk. Methods of making and using such compositions are also described. These standardized human milk formulations can be used to feed, e.g., preterm infants, without mixing them with other fortifiers or milk. Thus, the compositions provide an infant with a human-derived nutritional formulation that can substitute for mother's milk. Human milk formulations can contain various caloric contents, for example, PROLACT24 (a full feed whole milk formulation) can contain about 24 Cal/oz or about 81 Cal/100 mL.

The compositions of the present disclosure are generated from human donor milk, e.g., pooled milk, which undergoes rigorous genetic screening, processing (e.g., to concentrate nutrients in the fortifier compositions, and/or to reduce bioburden), and pasteurization. The milk can be supplemented with various minerals and/or vitamins. Thus, the disclosure also features methods of obtaining and processing milk from human donors.

The methods of the present disclosure can be used to process large volumes of donor milk, e.g., about 75-2,000 liters/lot of starting material.

Nutritional Requirements of Premature Infants

There are many factors that can affect the clinical outcome of a newborn, e.g., prematurely born, infant. Preterm infants have vulnerable immune systems, immature digestive systems, and increased total caloric and specific nutrient needs (when generally compared with term infants). Thus, nutrition provided to such infants is an important factor in their growth and development. Human milk has long been recognized as the ideal food for preterm and term infants because of its nutritional composition and immunologic benefits. Not every mother, however, can or will breastfeed her baby (or use a breast pump and store her milk). For example, mothers who have certain diseases, e.g., active tuberculosis, or are being administered radioisotopes, antimetabolites, or chemotherapy may not breast feed their infants. In addition, mother's own milk may not contain sufficient nutritional content to sustain a preterm infant. Use of donor milk can also be problematic, as such milk may not contain adequate nutrition for a preterm infant.

The present disclosure features human milk compositions and methods of making and using such compositions for feeding and/or increasing the nutritional value of milk fed to infants, e.g., premature infants. The fortifiers described herein (e.g., PROLACTPLUS™) can deliver a high level of, e.g., protein and/or calories to the milk and therefore to the infant. The standardized human milk formulations (e.g., PROLACT20™ and NEO20™) can be used instead of mother's own milk. The compositions can be supplemented with various vitamins and/or minerals. The compositions can also contain IgA (e.g., secretory IgA) and various components described herein.

Obtaining Human Milk from Qualified and Selected Donors

The compositions of the present disclosure are generated from donated human milk. Various techniques are used to identify and qualify suitable donors. A potential donor must obtain a release from her physician and her child's pediatrician as part of the qualification process.

This helps to insure, inter alia, that the donor is not chronically ill and that her child will not suffer as a result of the donation(s). Methods and systems for qualifying and monitoring milk collection and distribution are described, e.g., in U.S. patent application Ser. No. 11/526,127 (U.S. 2007/0098863), which is incorporated herein by reference in its entirety.

Generally, the donor screening process includes both interviews and biological sample processing. Any blood sample found positive for, e.g., viral contamination, on screening removes the donor from the qualification process.

Once a donor qualifies and begins sending milk, milk from each of her shipments is tested for, e.g., B. cereus and drugs of abuse (e.g., cocaine, opiates, methamphetamines, benzodiazepine, amphetamines, and THC).

Any positive finding results in the deferral of the donor and destruction of all previously-collected milk.

Donors may be periodically requalified. For example, a donor is required to undergo screening by the protocol used in their initial qualification every four months, if the donor wishes to continue to donate. A donor who does not requalify or fails qualification is deferred until such time as they do, or permanently deferred if warranted by the results of requalification screening. In the event of the latter situation, all remaining milk provided by that donor is removed from inventory and destroyed.

A qualified donor may donate at a designated facility (e.g., a milk bank office) or, typically, expresses milk at home. The qualified donor can be provided with supplies by a milk bank or directly from a milk processor (the milk bank and processor may be the same or different entities) to take home. The supplies will typically comprise a computer readable code (e.g., a barcode-label) on containers and may further include a breast pump. The donor can then pump and freeze the milk at home at a temperature of about −20° C. or colder. The donor milk is accepted, provided that the donor is a qualified donor; if such results are satisfactory, an appointment is made for the donor to drop off the milk at the center, or to have it collected from home. A donor can also ship the milk directly to the milk bank center or milk processor in insulated containers provided by the milk bank or milk processor. The milk and container are examined for their condition and the barcode information checked against the database. If satisfactory, the units are placed in the donor milk center or processing center freezer (−20° C. or colder) until ready for further testing and processing.

Because in some embodiments of the present methods the milk is expressed by the donor at her home and not collected at the milk banking facility, each donor's milk is sampled for genetic markers, e.g., DNA markers, to guarantee that the milk is truly from the registered donor. Such subject identification techniques are known in the art (see, e.g., International Application Serial No. PCT/US2006/36827, which is incorporated herein by reference in its entirety). The milk may be stored (e.g., at −20° C. or colder) and quarantined until the test results are received. Throughout the above process, any non-complying milk specimens are discarded, and the donor is disqualified. Access to all confidential information about the donor, including blood test data, is carefully controlled and meets Health Insurance Portability and Accountability Act (HIPAA) requirements.

Processing Donated Human Milk

Collected donor human milk is processed to obtain, e.g., a human milk fortifier, and/or standardized human milk formulation.

Methods of Obtaining Human Milk Fortifiers

FIG. 1 is a chart showing an embodiment of generating a human milk fortifier (e.g., PROLACTPLUS™). A detailed embodiment is discussed in Example 1 below. As discussed above, donor milk is carefully analyzed for both identification purposes and to avoid contamination. The donor milk is frozen and, when desired, thawed and pooled. It is then screened (step 1 of FIG. 1), e.g., genetically screened, e.g., by polymerase chain reaction (PCR). Genetic screening is done to identify any contaminants, e.g., viral, e.g., HIV-1, HBV, and/or HCV. The milk then undergoes filtering, e.g., through about a 200 micron filter (step 2), and heat treatment (step 3). For example, the composition can be treated at about 63° C. or greater for about 30 minutes or more. In step 4, the milk is transferred to a separator, e.g., a centrifuge, to separate the cream from the skim. The skim can be transferred into a second processing tank where it remains at about 2 to 8° C. until a filtration step (step 5).

Optionally, the cream separated from the skim in step 4, can undergo separation again to yield more skim.

Following separation of cream and skim (step 4), a desired amount of cream is added to the skim, and the composition undergoes further filtration (step 5), e.g., ultrafiltration. This process concentrates the nutrients in the skim milk by filtering out the water. The water obtained during the concentration is referred to as the permeate. Filters used during the ultrafiltration can be postwashed and the resulting solution added to the skim to maximize the amount of nutrients obtained, e.g., obtaining a protein concentration of about 7% to 7.2%. The skim is then blended with the cream (step 6) and samples taken for analysis. At this point during the process, the composition generally contains: about 8.5% to 9.5% of fat; about 6.3% to 7.0% of protein; and about 8% to 10.5% of carbohydrates, e.g., lactose.

After the separation of cream and skim in step 4, the cream flows into a holding tank, e.g., a stainless steel container. The cream can be analyzed for its caloric, protein and fat content. When the nutritional content of cream is known, a portion of the cream can be added to the skim milk that has undergone filtration, e.g., ultrafiltration, (step 5) to achieve the caloric, protein and fat content required for the specific product being made. Minerals can be added to the milk prior to pasteurization.

At this point, in one embodiment, the processed composition can be frozen prior to the addition of minerals and thawed at a later point for further processing. Any extra cream that was not used can also be stored, e.g., frozen. Optionally, before the processed composition is frozen, samples are taken for mineral analysis. Once the mineral content of the processed milk is known, the composition can be thawed (if it were frozen) and a desired amount of minerals can be added to achieve target values.

After step 6 and/or the optional freezing and/or mineral addition, the composition undergoes pasteurization (step 7). For example, the composition can be placed in a process tank that is connected to the high-temperature, short-time (HTST) pasteurizer via platinum-cured silastic tubing. After pasteurization, the milk can be collected into a second process tank and cooled. Other methods of pasteurization known in the art can be used. For example, in vat pasteurization the milk in the tank is heated to a minimum of 63° C. and held at that temperature for a minimum of thirty minutes. The air above the milk is steam heated to at least three degrees Celsius above the milk temperature. In one embodiment, the product temperature is about 66° C. or greater, the air temperature above the product is about 69° C. or greater, and the product is pasteurized for about 30 minutes or longer. In another embodiment, both HTST and vat pasteurization are performed.

The resulting fortifier composition is generally processed aseptically. After cooling to about 2 to 8° C., the product is filled into containers of desired volumes, and various samples of the fortifier are taken for nutritional and bioburden analysis. The nutritional analysis ensures proper content of the composition. A label that reflects the nutritional analysis is generated for each container. The bioburden analysis tests for presence of contaminants, e.g., total aerobic count, *B. cereus, E. coli, Coliform, Pseudomonas, Salmonella, Staphylococcus,* yeast, and/or mold. Bioburden testing can be genetic testing. The product is packaged and shipped once the analysis is complete and desired results are obtained.

Methods of Obtaining Standardized Human Milk Formulations

Figure 2:
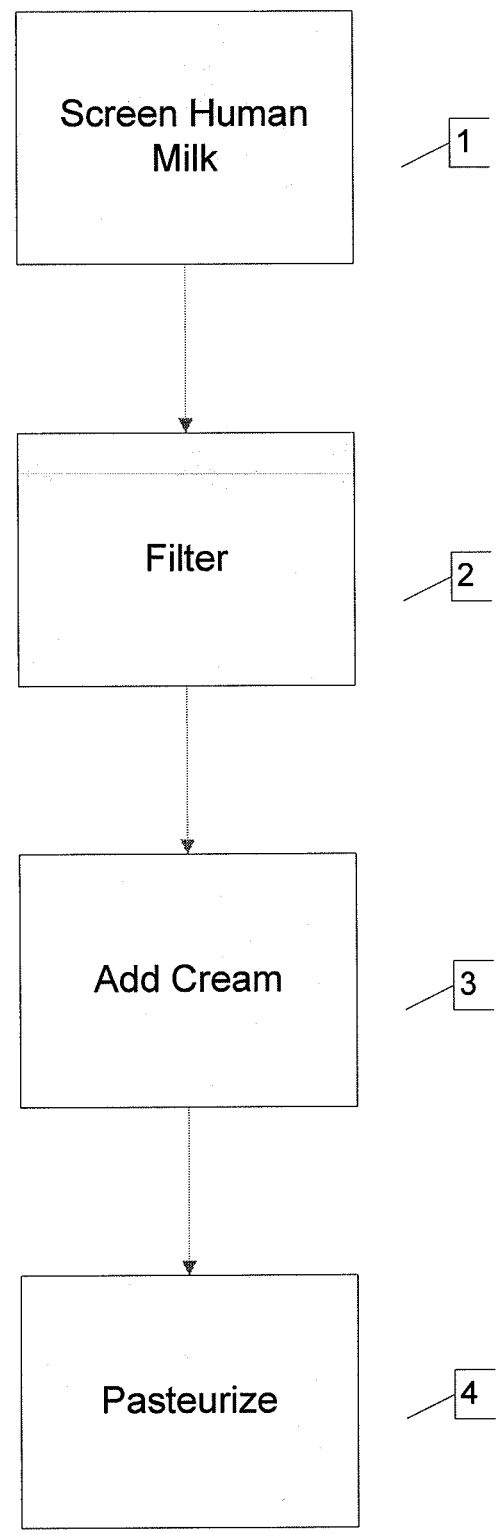
FIG. 2 is a chart of an embodiment of a method of making standardized human milk.

FIG. 2 and Examples 3 and 4 below show some embodiments of the methods for obtaining standardized human milk formulations (e.g., PROLACT20™ and NEO20™).

As discussed above, donor milk is screened to ensure the identity of the donors and reduce the possibility of contamination. Donor milk is pooled and further screened (step 1 of FIG. 2), e.g., genetically screened (e.g., by PCR). The screening can identify, e.g., viruses, e.g., HIV-1, HBV, and/or HCV. Milk that tests positive is discarded. After the screening, the composition undergoes filtering (step 2). The milk is filtered through about a 200 micron screen and then ultrafiltered. During ultrafiltration, water is filtered out of the milk (and is referred to as permeate) and the filters are postwashed using the permeate. Post wash solution is added to the milk to recover any lost protein and increase the concentration of the protein to, e.g., about 1.2% to about 1.5%. Referring to FIG. 2, cream from another lot (e.g., excess cream from a previous fortifier lot) is added in step 3 to increase the caloric content. At this stage of the process, the composition generally contains: about 3.5% to 5.5% of fat; about 1.1% to 1.3% of protein; and about 8% to 10.5% of carbohydrates, e.g., lactose.

At this stage, the composition can be frozen and thawed out for further processing later.

Optionally, if the human milk formulation is to be fortified with minerals, a mineral analysis of the composition is carried out after step 3. Once the mineral content is known, a desired amount of minerals can be added to achieve target values.

In step 4, the composition is pasteurized. Pasteurization methods are known in the art. For example, the product can be pasteurized in a tank that is jacketed. Hot glycol can be use to heat up the tank. The product temperature can be about 63° C. or greater and the air temperature above the product about 66° C. or greater. The product is pasteurized for a minimum of about 30 minutes. Other pasteurizing techniques are known in the art.

After cooling to about 2 to 8° C., the product is filled into containers of desired volumes and various samples of the human milk formulation are taken for nutritional and bioburden analysis. The nutritional analysis ensures proper content of the composition. A label generated for each container reflects the nutritional analysis. The bioburden analysis tests for presence of contaminants, e.g., total aerobic count, *B. cereus, E. coli, Coliform, Pseudomonas, Salmonella, Staphylococcus,* yeast, and/or mold. The product is packaged and shipped once the analysis is complete and desired results are achieved.

Effects of the Featured Methods on Components and Bioburden of Human Milk

Human milk comprises about 100,000 different molecular entities—proteins, lipids, carbohydrates, vitamins, and trace minerals. Some specific components include the monomeric immunoglobulin A (IgA) and the dimeric secretory IgA (s[IgA]$_2$), lysozyme, and lactoferrin. Accordingly, the methods featured herein (which include pasteurization), while helping to ensure the safety of the milk product, should also preserve adequate quantities of those components, which are potentially heat labile. As described in Example 5 below and Table 3, pasteurization methods featured herein can preserve a large amount of IgA, lysozyme, and Vitamin B6 in the processed milk. As described in Example 5 below and Table 2, the featured methods are able to reduce any bioburden of human milk.

Human Milk Compositions

The compositions featured herein contain various amounts of nutrients, e.g., protein, carbohydrates, fat, vitamins, and minerals, as well as other milk components, such as IgA and lysozyme. Human milk fortifiers provide a concentrated amount of nutrients and calories that can be added to, e.g., mother's milk. Standardized human milk formulations can be supplemented with vitamins and/or minerals if desired and can be fed directly to an infant, e.g., a premature infant. The methods of generating these compositions are designed to optimize the amount of nutrients and calories in the compositions. For example, the compositions featured herein can deliver from about 3.3 to about 5.5 grams of protein/kg/day to an infant receiving a full feeding of 150 mL per day and/or 3.2 to 4.1 grams of protein/kg/day to infants receiving 120 Cal/kg/day.

Human Milk Fortifiers

The human milk fortifiers featured herein contain concentrated amounts of nutrients. In one embodiment, the fortifier can contain a human protein constituent of about 35-85 mg/mL; a human fat constituent of about 60-110 mg/mL; and a human carbohydrate constituent of about 60-140 mg/mL. Total caloric content of the fortifier can be, e.g., about 0.92 to about 1.89 Cal/mL. In particular, one embodiment can include the protein constituent of about 55-65 mg/mL; the fat constituent of about 85-95 mg/mL; and the carbohydrate constituent of about 70-120 mg/mL.

The fortifier can be supplemented with minerals, if desired. In one embodiment, the minerals can include: calcium concentration of about 4.0-5.5 mg/mL; chloride concentration of about 0.35-0.95 mg/mL; copper concentration of about 0.0005-0.0021 mg/mL; iron concentration of about 0.001-0.700 mg/mL; magnesium concentration of about 0.180-0.292 mg/mL; manganese concentration of about 0.010-0.092 micrograms/mL; phosphorus concentration of about 2.00-3.05 mg/mL; potassium concentration of about 1.90-2.18 mg/mL; sodium concentration of about 0.75-0.96 mg/mL; and zinc concentration of about 0.0200-0.0396 mg/mL. In another embodiment, the minerals can include calcium concentration of about 2.00-2.9 mg/mL; chloride concentration of about 0.175-0.475 mg/mL; copper concentration of about 0.00025-0.001 mg/mL; iron concentration of about 0.0005-0.0025 mg/mL; magnesium concentration of about 0.090-0.170 mg/mL; manganese concentration of about 0.005-0.046 micrograms/mL; phosphorus concentration of about 1.00-1.50 mg/mL; potassium concentration of about 0.95-1.41 mg/mL; sodium concentration of about 0.375-0.608 mg/mL; and zinc concentration of about 0.010-0.0198 mg/mL.

An exemplary fortifier (e.g., PROLACT+4™ and PROLACT+6™) can include the following components: human milk, calcium carbonate, potassium phosphate, calcium phosphate, calcium glycerophosphate, calcium gluconate, sodium citrate, magnesium chloride, calcium chloride, magnesium phosphate, zinc sulphate, cupric sulfate, and manganese sulfate. An exemplary fortifier can have the following characteristics per 100 mL: about 135-155 Cal; about 8.5-9.5 g of total fat; about 75-96 mg of sodium; about 190-218 mg of potassium; about 7.0-12.0 g of total carbohydrates; about 5.5-10.0 g of sugars; about 5.5-6.5 g of protein; about 1000-5000 IU of Vitamin A; less than about 1 mg of Vitamin C; about 400-550 mg of calcium; about 0.1-0.5 mg of iron; about 200-305 mg of phosphorus; about 18-29.2 mg of magnesium; about 35-95 mg of chloride; about 2.0-4.0 mg of zinc; about 0.05-0.21 mcg of copper; and less than about 9.2 mcg of manganese; with the osmolality of ~343 mOsm/Kg $H_2O$ (when mixed with raw human milk at the ratio of about 80% raw milk to 20% fortifier).

Fortifiers with other constituents and constituents of different concentrations are encompassed by this disclosure.

The fortifiers featured herein can be mixed with mother's milk at various concentrations, depending on the nutritional content of the mother's milk and the needs of the infant. For example, a mother's raw milk can be tested to determine the raw milk's nutritional value. Typical raw milk comprises, on average, 1.1 g protein, 3.2 g fat, 7.7 g carbohydrates (primarily lactose), and supplies about 64 kcal of energy per 100 mL. After testing, the mother's milk can be adjusted by adding a fortifier composition discussed herein. For example, the fortifiers can add from about 2 to about 10 Cal/oz and/or from 3.3 to 5.5 g/protein/kg/day when considering a full feeding of 150 mL/day and/or 3.2 to 4.1 grams of protein/kg/day to infants receiving 120 Cal/kg/day. If a lower dose of the fortifier and the nutrients is needed, the mixture can include about 20% of the fortifier and about 80% of raw human milk (adding about 4 Cal/oz) (e.g., the mixture with PROLACT+4™). If a higher dose of the nutrients is needed, the mixture can include about 50% of raw human milk and about 50% of the fortifier (e.g., the mixture with PROLACT+10™). Other ratios of the mixtures are encompassed by this disclosure, including (but not limited to): about 30% fortifier with about 70% raw human milk (e.g., the mixture with PROLACT+6™) and about 40% of fortifier with about 60% of raw human milk (e.g., the mixture with PROLACT+8™). Example 2 below and Table 2 show some embodiments of the mixtures and their nutritional information.

Standardized Human Milk Formulations

The standardized human milk formulations featured herein can be used in lieu of mother's own milk to feed the infants, e.g., premature infants. They include various nutritional components for infant growth and development.

In one embodiment, the standardized human milk formulation can include: a human protein constituent of about 11-20 mg/mL; a human fat constituent of about 35-55 mg/mL; and a human carbohydrate constituent of about 70-120 mg/mL. In a particular embodiment, the formulation can contain: a human protein constituent of about 11-13 mg/mL; a human fat constituent of about 35-55 mg/mL; and a human carbohydrate constituent of about 80-105 mg/mL. The total caloric content of the formulations can be, e.g., from about 0.68 Cal/mL to about 0.96 Cal/mL.

The milk formulation can be supplemented with vitamins and/or minerals. In one embodiment, the composition can include: calcium concentration of about 0.40-1.50 mg/mL; chloride concentration of about 0.30-0.80 mg/mL; copper concentration of about 0.0005-0.0021 mg/mL; iron concentration of about 0.001-0.005 mg/mL; magnesium concentration of about 0.03-0.13 mg/mL; manganese concentration of about 0.01-0.092 mg/mL; phosphorus concentration of about 0.15-0.631 mg/mL (e.g., about 0.15-0.60 mg/mL); potassium concentration of about 0.60-1.20 mg/mL; sodium concentration of about 0.20-0.60 mg/mL; and zinc concentration of about 0.0025-0.0120 mg/mL.

The human milk formulations can contain various caloric content, e.g., 67 Kcal/dL (20 Calorie per ounce), and 81 Kcal/dL (24 Calorie per ounce). An exemplary human milk formulation (e.g., PROLACT24™) can include the following constituents: human milk, calcium glycerophosphate, potassium citrate, calcium gluconate, calcium carbonate, magnesium phosphate, sodium chloride, sodium citrate, zinc sulfate, cupric sulfate, and manganese sulfate. This exemplary composition can have the following characteristics per 100 ml: about 81 Cal; about 4.4 g of total fat; about 20.3 mg of sodium; about 60.3 mg of potassium; about 8 g total carbohydrates; about 5-9 g of sugars; about 2.3 g of protein; about 180-250 IU of Vitamin A; less than about 1.0 mg of Vitamin C; about 40.0-150.0 mg of calcium; about 100-150 mcg of iron; about 15-50 mg of phosphorus; about 3-10 mg of magnesium; about 25-75.0 mg of chloride; about 1.2 mcg of zinc; about 140-190 mcg of copper; less than about 60.2 mcg of manganese; and Osmolarity of about 322 mOsm/Kg $H_2O$. Milk formulations with other constituents and constituents of different concentrations are encompassed by this disclosure.

Specific Components of the Featured Compositions

One component of the milk compositions and fortifiers featured herein is protein. In the body, protein is needed for growth, synthesis of enzymes and hormones, and replacement of protein lost from the skin, urine and feces. These metabolic processes determine the need for both the total amount of protein in a feeding and the relative amounts of specific amino acids. The adequacy of the amount and type of protein in a feeding for infants is determined by measuring growth, nitrogen absorption and retention, plasma amino acids, certain blood analytes and metabolic responses. Some proteins present in the featured compositions beneficial for other than purely nutritional reasons include human IgA, lysozyme, and lactoferrin.

Another constituent of the milk compositions described herein is fat. Fat is generally a source of energy for LBW infants, not only because of its high caloric density but also because of its low osmotic activity in solution. Thus, optionally, the milk compositions of the invention can be supplemented with fat constituents. Such heterologous fat constituents include specific fatty acids such as docosahexaenoic acid (DHA) and arachidonic acid.

Vitamins and minerals are important to proper nutrition and development of an infant. A premature infant or LBW infant requires electrolytes, e.g., sodium, potassium and chloride for growth and for acid-base balance. Sufficient intakes of these electrolytes are also needed for replacement of losses in the urine and stool and from the skin. Calcium, phosphorus and magnesium are needed for proper bone mineralization and growth.

Trace minerals are associated with cell division, immune function and growth. Consequently, sufficient amounts of trace minerals are needed for infant growth and development. Some trace minerals that are important include, e.g., copper, magnesium and iron (which is important, e.g., for the synthesis of hemoglobin, myoglobin and iron-containing enzymes). Zinc is needed, e.g., for growth, for the activity of numerous enzymes, and for DNA, RNA and protein synthesis. Copper is necessary for, e.g., the activity of several important enzymes. Manganese is needed, e.g., for the development of bone and cartilage and is important in the synthesis of polysaccharides and glyoproteins. Accordingly, the human milk formulations and fortifier compositions of the invention can be supplemented with vitamins and minerals as described herein.

Vitamin A is a fat-soluble vitamin essential for, e.g., growth, cell differentiation, vision and proper functioning of the immune system. Vitamin D is important, e.g., for absorption of calcium and to a lesser extent, phosphorus, and for the development of bone. Vitamin E (tocopherol) prevents peroxidation of polyunsaturated fatty acids in the cell, thus preventing tissue damage. Folic acid plays a role in, e.g., amino acid and nucleotide metabolism. Serum folate concentrations have been shown to fall below normal after 2 weeks of age in LBW infants with low folic acid intakes. Additionally, several B vitamins are present at low concentrations in preterm milk.

As described above, the variability of human milk vitamin and mineral concentrations and the increased needs of the preterm infant often require some fortification to insure that a developing infant is receiving adequate amounts of vitamins and minerals. Examples of vitamins and minerals that can be added to the human milk compositions featured herein include: vitamin A, vitamin B1, vitamin B2, vitamin B6, vitamin B12, vitamin C, vitamin D, vitamin E, vitamin K, biotin, folic acid, pantothenic acid, niacin, m-inositol, calcium, phosphorus, magnesium, zinc, manganese, copper, sodium, potassium, chloride, iron and selenium. The compositions can also be supplemented with: chromium, molybdenum, iodine, taurine, carnitine and choline may also require supplementation.

The osmolality of human milk fortifiers and standardized milk formulations featured herein can affect adsorption, absorption, and digestion of the compositions. High osmolality, e.g., above about 400 mOsm/Kg $H_2O$, has been associated with increased rates of necrotizing enterocolitis (NEC), a gastrointestinal disease that affects neonates (see, e.g., Srinivasan et al., *Arch. Dis. Child Fetal Neonatal Ed.* 89:514-17, 2004). The osmolality of the human milk composition and fortifier (once mixed with raw milk) of the disclosure is typically less than about 400 mOsm/Kg $H_2O$. Typically the osmolality is from about 310 mOsm/Kg of water to about 380 mOsm/Kg of water. The osmolality can be adjusted by methods known in the art.

Kits

The present disclosure also features kits that include the human milk fortifiers described herein and containers for mixing the fortifiers with raw human milk. The containers can include bottles, e.g., graduated bottles to assist in proper dilution, syringes, cans, and other containers known in the art.

Processing of the Featured Compositions in NICU

Preparation of the Fortifiers and Standardized milk products in, e.g., NICUs, is adjusted depending on the needs of the patients and the policies of various hospitals. Thus, the amount of milk prepared, e.g., with the fortifiers, will be determined on site.

The embodiments of the disclosure may, of course, be carried out in other ways than those set forth herein without departing from the spirit and scope of the disclosure. The embodiments are, therefore, to be considered in all respects as illustrative and not restrictive.

EXAMPLE 1

Production and Compositions of PROLACTA™ Bioscience Human Milk Fortifier (HMF)

The PROLACTA™ Bioscience Human Milk Fortifier (HMF) (PROLACTPLUS™) was produced using the following steps. Processing was done in a class 100,000 clean room (ISO class 8), and filling was done in a class 10,000 clean room (ISO class 7):

1. Donor milk was pooled.
2. A sample was taken for Polymerase Chain Reaction (PCR) for the following viruses:
   a. HIV-1
   b. HBV—Hepatitis B
   c. HCV—Hepatitis C
3. Donor milk was filtered through a 200 micron screen.
4. Donor milk was heat-treated at 63° C. or greater for 30 minutes.

5. Milk was separated into in skim milk and cream, which had the following concentrations:
   a. Skim: 0.3%-0.69% Fat, 0.9%-1.2% Protein, 6%-10% Lactose
   b. Cream: 25%-46% Fat, 0.5%-2% Protein, 8-10% Lactose
6. The Cream can be, if desired, taken and run through the separator:
   a. This step produces more skim milk, which increases the yield because the more skim is produced, the more HMF can be produced.
   b. The product that comes out the non-skim side of the separator is currently considered waste.
7. Cream was added to skim for better ultra filtration during concentration step. The fat in the skim was from 55% to 65% of the protein content.
8. Skim milk underwent ultra filtration. This step filtered water out of the skim milk. The water was referred to as permeate. The final concentration during this step was 7%-10% of protein.
9. Post wash of the filters using permeate was carried out to recover any protein that was trapped on the filters during the ultra filtration process. The post wash was added to the concentrated skim milk until protein concentration reached 7.0%-7.2%.
10. During the Bulk formulation, cream was added to the concentrated skim milk, after post wash was added. This step increased calories to the correct target. At this point, the product was at:
   a. Fat—8.5%-9.5%;
   b. Protein—6.3%-7.0%; and
   c. Lactose—8%-10.5%.
11. A sample of the Bulk was sent for mineral analysis. This analysis of the initial mineral content allowed for later determination of the amount of minerals that needed to be added to the product (see, e.g., step 14).
12. The Bulk was frozen at −20° C. or colder.
13. When the mineral results were returned from the lab, the Bulk was thawed.
14. Based on the mineral concentration in the starting material (determined in step 11 above), it was calculated how much more of the minerals needed to be added.
The final targets are set out below. PROLACT+4™, PROLACT+6™, PROLACT+8™, and PROLACT+10™ fortifiers are used in mixtures with human milk and are further discussed in Example 2 below.
   a. PROLACT+4™ and PROLACT+6™
      i. Calcium—400.0 mg/dL to 550.0 mg/dL
      ii. Chloride—35 mg/dL to 95.0 mg/dL
      iii. Copper—0.05 mg/dL to 0.21 mg/dL
      iv. Iron—0.1 mg/dL to 0.7 mg/dL
      v. Magnesium—18.0 mg/dL to 29.2 mg/dL
      vi. Manganese—1.0 micrograms/dL to 9.2 micrograms/dL
      vii. Phosphorus—200.0 mg/dL to 305.0 mg/dL
      viii. Potassium—190.0 mg/dL to 218.0 mg/dL
      ix. Sodium—75 mg/dL to 96 mg/dL
      x. Zinc—2.0 mg/dL to 3.96 mg/dL
   b. PROLACT+8 ™ and PROLACT+10™
      i. Calcium—200.0 mg/dL to 290 mg/dL
      ii. Chloride—17.5 mg/dL to 47.5 mg/dL
      iii. Copper—0.025 mg/dL to 0.1 mg/dL
      iv. Iron—0.05 mg/dL to 0.25 mg/dL
      v. Magnesium—9.0 mg/dL to 14.6 mg/dL
      vi. Manganese—0.5 micrograms/dL to 4.6 micrograms/dL
      vii. Phosphorus—100.0 mg/dL to 150.0 mg/dL
      viii. Potassium—95.0 mg/dL to 141.0 mg/dL
      ix. Sodium—37.5 mg/dL to 60.8 mg/dL
      x. Zinc—1.0 mg/dL to 1.98 mg/dL
   c. PROLACT+6™ will also be made with the following formulation:
      i. Calcium—250.0 mg/dL to 425.0 mg/dL
      ii. Chloride—15 mg/dL to 75.0 mg/dL
      iii. Copper—0.05 mg/dL to 0.21 mg/dL
      iv. Iron—0.1 mg/dL to 0.5 mg/dL
      v. Magnesium—10.0 mg/dL to 25.0 mg/dL
      vi. Manganese—1.0 micrograms/dL to 9.2 micrograms/dL
      vii. Phosphorus—125.0 mg/dL to 225.0 mg/dL
      viii. Potassium—60.0 mg/dL to 105.0 mg/dL
      ix. Sodium—50.0 mg/dL to 90 mg/dL
      x. Zinc—2.0 mg/dL to 3.96 mg/dL
15. The Final Bulk was heated to 50° C.-55° C. and the minerals were mixed into the Final Bulk.
16. After the minerals have been mixed, the product was pasteurized in a tank. The tank was jacketed and hot glycol was used to heat up the tank. The following parameters were followed:
   a. The product temperature was 66° C. or greater;
   b. The air temperature above the product was 69° C. or greater; and
   c. The product was pasteurized for a minimum of 30 minutes.
17. The product temperature was brought down to 2° C.-8° C. using cold glycol in the jacketed tank.
18. The product was filled into bottles using a Watson-Marlow filling machine in the class 10,000 clean room. The fill sizes were as follows:
   a. PROLACT+4™ 10 mL
   b. PROLACT+4™ 20 mL
   c. PROLACT+4™ 100 mL
   d. PROLACT+6™ 15 mL
   e. PROLACT+6™ 30 mL
   f. PROLACT+8™ 20 mL
   g. PROLACT+8™ 40 mL
   h. PROLACT+10™ 25 mL
   i. PROLACT+10™ 50 mL.
19. When the fill was finished, the bottles were used as follows:
   a. BioBurden samples—2 bottles from the beginning, middle and end of the fill run, for a total of 6 bottles were taken for tests;
   b. Nutritional samples—1 bottle from the beginning, middle, and end of the fill run, for a total of 3 bottles were taken for tests; and
   c. Retention samples—120 mL of product was retained.
20. The analysis was done on the BioBurden samples for the following:
   a. Total Aerobic Count—<100 Colony Forming Unit/mL;
   b. *Bacillus cereus*—<10 Colony Forming Unit/mL;
   c. *E. coli*—<1 Colony Forming Unit/mL;
   d. Coliform—<1 Colony Forming Unit/mL;
   e. *Pseudomonas*—<1 Colony Forming Unit/mL;
   f. *Salmonella*—<1 Colony Forming Unit/mL;
   g. *Staphylococcus*—<1 Colony Forming Unit/mL;
   h. Yeast—<100 Colony Forming Unit/mL; and
   i. Mold—<100 Colony Forming Unit/mL.
21. The following nutritional analysis was conducted.
   a. PROLACT+4™ or PROLACT+6™
      i. Total Calories—1.35 Cal/mL to 1.55 Cal/mL
      ii. Protein—5.5 g/dL to 6.5 g/dL
      iii. Fat—8.5 g/dL to 9.5 g/dL
      iv. Lactose—7.0 g/dL to 12.0 g/dL
      v. Calcium—400.0 mg/dL to 550.0 mg/dL
      vi. Chloride—35 mg/dL to 95.0 mg/dL
      vii. Copper—0.05 mg/dL to 0.21 mg/dL
      viii. Iron—0.1 mg/dL to 0.7 mg/dL
      ix. Magnesium—18.0 mg/dL to 29.2 mg/dL
      x. Manganese—1.0 micrograms/dL to 9.2 micrograms/dL
      xi. Phosphorus—200.0 mg/dL to 305.0 mg/dL xii. Potassium—190.0 mg/dL to 218.0 mg/dL
xiii. Sodium—75 mg/dL to 96 mg/dL
xiv. Zinc—2.0 mg/dL to 3.96 mg/dL
b. PROLACT+8™ or PROLACT+10™
i. Total Calories—1.35 Cal/mL to 1.55 Cal/mL
ii. Protein—5.5 g/dL to 6.5 g/dL
iii. Fat—8.5 g/dL to 9.5 g/dL
iv. Lactose—7.0 g/dL to 12.0 g/dL
v. Calcium—200.0 mg/dL to 275 mg/dL
vi. Chloride—17.5 mg/dL to 47.5 mg/dL
vii. Copper—0.025 mg/dL to 0.1 mg/dL
viii. Iron—0.05 mg/dL to 0.25 mg/dL
ix. Magnesium—9.0 mg/dL to 14.6 mg/dL
x. Manganese—0.5 micrograms/dL to 4.6 micrograms/dL
xi. Phosphorus—100.0 mg/dL to 150.0 mg/dL
xii. Potassium—95.0 mg/dL to 141.0 mg/dL
xiii. Sodium—37.5 mg/dL to 60.8 mg/dL
xiv. Zinc—1.0 mg/dL to 1.98 mg/dL
c. PROLACT+6™ will also be made with the following formulation:
i. Total Calories—1.35 Cal/mL to 1.55 Cal/mL
ii. Protein—5.5 g/dL to 6.5 g/dL
iii. Fat—8.5 g/dL to 9.5 g/dL
iv. Lactose—7.0 g/dL to 12.0 g/dL
v. Calcium—250.0 mg/dL to 425.0 mg/dL
vi. Chloride—35 mg/dL to 75.0 mg/dL
vii. Copper—0.05 mg/dL to 0.21 mg/dL
viii. Iron—0.1 mg/dL to 0.5 mg/dL
ix. Magnesium—10.0 mg/dL to 25.0 mg/dL
x. Manganese—1.0 micrograms/dL to 9.2 micrograms/dL
xi. Phosphorus—125.0 mg/dL to 225.0 mg/dL
xii. Potassium—190.0 mg/dL to 218.0 mg/dL
xiii. Sodium—50 mg/dL to 90 mg/dL
xiv. Zinc—2.0 mg/dL to 3.96 mg/dL 22. Once the nutritional analysis was complete, a label was generated with the actual values from the lab. Generally, a normal procedure for foods is to put an average on the label. These Prolact products, however, show what was specifically in each bottle.

23. The product was shipped to customers in insulated coolers on dry ice. Cool blocks can also be used in lieu of dry ice for shipping.

EXAMPLE 2

Production and Compositions of Various Types of PROLACTA™ Human Milk Products Based on Human Milk Fortifier The human milk fortifiers (HMFs) produced, e.g., as described in Example 1 supra, were mixed at various concentrations with raw human milk (e.g., the milk from the mother of the premature infant). Depending on the nutritional content of mother's own milk and the needs of the infant, HMF can be mixed at various ratios. PROLACT+4™ is a composition meant to be mixed at a ration of about 80% of raw milk with 20% of HMF. PROLACT+6™ is a composition meant to be mixed at a ratio of about 70% raw milk and 30% HMF. PROLACT+8™ is a composition meant to be mixed at a ratio of about 60% raw milk and 40% HMF. PROLACT+10™ is meant to be mixed at a ratio of about 50% of raw milk and 50% of HMF. The mixing was done by the customers, not at the PROLACTA™ facilities. The table below shows an exemplary nutritional comparison of nutrients in raw milk, and the four PROLACTPLUS™ compositions mixed at various ratios with raw milk.

TABLE 1

Nutritional Comparison of Raw Human Milk and Four PROLACTPLUS Human Milk Fortifier Compositions Per 100 mL*

| Nutrient | Unit | Preterm Milk+ | PROLACT+4 ™ | PROLACT+6 ™ | PROLACT+8 ™ | PROLACT+10 ™ |
|---|---|---|---|---|---|---|
| mixing ratios: mother to fortifier | | 100% | 80:20 | 70:30 | 60:40 | 50:50 |
| Volume | mL | 100 | 100 | 100 | 100 | 100 |
| Energy | cal | 68 | 84 | 91 | 99 | 107 |
| protein (human) | g | 1.3 | 2.2 | 2.7 | 3.2 | 3.7 |
| carbohydrates | g | 7.0 | 7.6 | 7.9 | 8.2 | 8.5 |
| fat (human)++ | g | 3.9 | 4.9 | 5.4 | 5.9 | 6.5 |
| Minerals ** | | | | | | |
| Sodium | mg | 46 | 54 | 58 | 54 | 56 |
| Potassium | mg | 66.3 | 71.1 | 73.5 | 71.1 | 72.3 |
| Calcium | mg | 28 | 128 | 178 | 128 | 153 |
| Phosphorus | mg | 14 | 63.1 | 87.7 | 63.1 | 75.4 |
| Magnesium | mg | 3.3 | 8 | 10.4 | 8 | 9.2 |
| Chloride | mg | 78.1 | 83.4 | 86.1 | 83.4 | 84.7 |
| Manganese | mcg | 0.4 | 2.36 | 3.2 | 2.36 | 2.79 |
| Copper | mg | 0.08 | 0.1 | 0.1 | 0.1 | 0.1 |
| Zinc | mg | 0.5 | 0.7 | 1.1 | 0.7 | 0.9 |
| Iron | mg | 0.1 | 0.2 | 0.2 | 0.2 | 0.2 |
| Osmolality | mOsm/kgH$_2$O | ≈290 | <335 | <360 | <325 | <350 |

+calculated based on various published studies on file at Prolacta Bioscience
++data for pre-term milk is not available; fat is calculated based upon total calories
*nutritional values are based upon minimum values from Product Manufacturing Specification for PROLACTPLUS ™ line of fortifiers
** based upon average of lots produced

EXAMPLE 3

Production and Compositions of Standardized Human Milk Formulations

The PROLACTA™ Bioscience NEO20™ is a standardized human milk formulation that was produced with the following steps. Processing was done in a class 100,000 clean room (ISO class 8), and filling was done in a class 10,000 clean room (ISO class 7):

1. Donor milk was pooled.
2. A sample was taken for Polymerase Chain Reaction (PCR) to test for the following viruses:
   a. HIV-1
   b. HBV—Hepatitis B
   c. HCV—Hepatitis C
3. Donor milk was filtered through 200 micron screen.
4. Whole milk underwent ultra filtration. This step filtered water out of the whole milk. The water was referred to as permeate. The final concentration of protein during this step was 1.2%-1.3%.
5. The filters were post-washed using permeate to recover any protein that was trapped on the filters during the ultra filtration process. The post wash was added to the concentrated whole milk until the protein concentration was 1.2%-1.5%.
6. During the Bulk formulation, cream from previous fortifier lots was added to the concentrated whole milk, after adding post wash to increase calories to the correct target. At this point, the product was at:
   a. Fat—3.5%-5.5%;
   b. Protein—1.1%-1.3%; and
   c. Lactose—8%-10.5%.
7. Next, the product was pasteurized in a tank. The tank was jacketed and hot glycol was used to heat up the tank. The following parameters were followed:
   a. The product temperature was 63° C. or greater;
   b. The air temperature above the product was 66° C. or greater; and
   c. The product was pasteurized for a minimum of 30 minutes.
8. The product temperature was brought down to 2° C.-8° C. using cold glycol in the jacketed tank.
9. The product was filled into bottles using a Watson-Marlow filling machine in the class 10,000 clean room. The fill sizes were as follows:
   a. NEO20™ 30 mL;
   b. NEO20™ 40 mL;
   c. NEO20™ 50 mL;
   d. NEO20™ 148 mL; and
   e. NEO20™ 200 mL.
10. When the fill was finished, the bottles were taken for the following tests:
   a. BioBurden samples—2 bottles from the beginning, middle and end of the fill run were taken, for a total of 6 bottles;
   b. Nutritional samples—1 bottle from the beginning, middle, and end of the fill run was taken, for a total of 3 bottles; and
   c. Retention samples—120 mL of product was retained.
11. The following parameters were tested in the BioBurden samples:
   a. Total Aerobic Count—<100 Colony Forming Unit/mL;
   b. *Bacillus cereus*—<10 Colony Forming Unit/mL;
   c. *E. coli*—<1 Colony Forming Unit/mL;
   d. Coliform—<1 Colony Forming Unit/mL;
   e. *Pseudomonas*—<1 Colony Forming Unit/mL;
   f. *Salmonella*—<1 Colony Forming Unit/mL;
   g. *Staphylococcus*—<1 Colony Forming Unit/mL;
   h. Yeast—<100 Colony Forming Unit/mL; and
   i. Mold—<100 Colony Forming Unit/mL.
12. Nutritional analysis was conducted for all fill sizes of NEO20™. The concentration values were in the following ranges:
   i. Total Calories—0.69 Cal/mL to 0.74 Cal/mL;
   ii. Protein—1.1 g/dL to 1.3 g/dL;
   iii. Fat—3.5 g/dL to 5.5 g/dL; and
   iv. Lactose—8.0 g/dL to 10.5 g/dL.
13. Once the nutritional analysis was complete, a label was generated with the actual values from the lab. Generally, a normal procedure for foods is to put an average on the label. These PROLACTA™ products, however, show what was specifically in each bottle.
14. The product was shipped to customers in insulated coolers on dry ice. Cool blocks can be used for shipping in lieu of dry ice.

EXAMPLE 4

Production and Compositions of Standardized Human Milk Fortified with Minerals The PROLACTA™ Bioscience PROLACT20™ is a standardized human milk product fortified with minerals. It was produced using the following steps in a class 100,000 clean room (ISO 8). Filling was done in a 10,000 clean room (ISO 7).

1. Donor milk was pooled.
2. A sample was taken for Polymerase Chain Reaction (PCR) tests for the following viruses:
   a. HIV-1
   b. HBV—Hepatitis B
   c. HCV—Hepatitis C
3. Donor milk was filtered through 200 micron screen.
4. Whole milk was ultra filtered. In this step water was filtered out of the whole milk. The water was referred to as permeate. The final concentration of protein during this step was 1.2%-1.3%.
5. The filters were post washed using permeate to recover any protein that was trapped on the filters during the ultra filtration process. The post wash was added to the concentrated whole milk until the protein was in the range of 1.2%-1.5%.
6. During the Bulk formulation, cream from previous fortifier lots was added to the concentrated whole milk after adding post wash, to increase calories to the correct target. At this point, the product was:
   a. Fat—3.5%-5.5%;
   b. Protein-1,1-1.3%; and
   c. Lactose—8%-10.5%.
7. At this stage, the product can be frozen and later thawed for further processing.
8. Based on the analysis of the starting minerals, it was calculated how much more of minerals needed to be added. The final targets were:
   a. Calcium—40 mg/dL to 150 mg/dL;
   b. Chloride—30 mg/dL to 80 mg/dL;
   c. Copper—0.05 mg/dL to 0.21 mg/dL;
   d. Iron—0.1 mg/dL to 0.5 mg/dL;
   e. Magnesium—3.0 mg/dL to 13 mg/dL;
   f. Manganese—1.0 micrograms/dL to 9.2 micrograms/dL;
   g. Phosphorus—15 mg/dL to 60 mg/dL;
   h. Potassium—60 mg/dL to 120 mg/dL;
   i. Sodium—20 mg/dL to 60 mg/dL; and
   j. Zinc—0.25 mg/dL to 1.2 mg/dL.

9. After mineral addition (and thawing, if the product was frozen), the product was pasteurized in a tank.

The tank was jacketed and hot glycol was used to heat up the tank. The following parameters were followed:
   a. The product temperature was 63° C. or greater;
   b. The air temperature above the product was 66° C. or greater; and
   c. The product was pasteurized for a minimum of 30 minutes.

10. The product temperature was brought down to 2° C.-8° C. using cold glycol in the jacketed tank.

11. The product was filled into bottles using a Watson-Marlow filling machine in the class 10,000 clean room. The fill sizes were as follows:
   a. PROLACT20™ 30 mL
   b. PROLACT20™ 40 mL
   c. PROLACT20™ 50 mL 12. When the fill was done, the bottles were taken for the following:
   a. BioBurden samples—2 bottles from the beginning, middle and end of the fill run were taken, for a total of 6 bottles;
   b. Nutritional samples—1 bottle from the beginning, middle, and end of the fill run was taken, for a total of 3 bottles; and
   c. Retention samples—120 mL of product was retained.

13. The following were tested in the BioBurden samples:
   a. Total Aerobic Count—<100 Colony Forming Unit/mL;
   b. *Bacillus cereus*—<10 Colony Forming Unit/mL;
   c. *E. coli*—<1 Colony Forming Unit/mL;
   d. Coliform—<1 Colony Forming Unit/mL;
   e. *Pseudomonas*—<1 Colony Forming Unit/mL;
   f. *Salmonella*—<1 Colony Forming Unit/mL;
   g. *Staphylococcus*—<1 Colony Forming Unit/mL;
   h. Yeast—<100 Colony Forming Unit/mL; and
   i. Mold—<100 Colony Forming Unit/mL.

14. Nutritional analysis was conducted for all fill sizes of PROLACT20™ after minerals were added. The ranges included:
   i. Total Calories—0.69 Cal/mL to 0.74 Cal/mL;
   ii. Protein—1.1 g/dL to 1.3 g/dL;
   iii. Fat—3.5 g/dL to 5.5 g/dL;
   iv. Lactose—8.0 g/dL to 10.5 g/dL;
   v. Calcium—40 mg/dL to 150 mg/dL;
   vi. Chloride—30 mg/dL to 80 mg/dL;
   vii. Copper—0.05 mg/dL to 0.21 mg/dL;
   viii. Iron—0.1 mg/dL to 0.5 mg/dL;
   ix. Magnesium—3.0 mg/dL to 13 mg/dL;
   x. Manganese—1.0 micrograms/dL to 9.2 micrograms/dL;
   xi. Phosphorus—15 mg/dL to 60 mg/dL;
   xii. Potassium—60 mg/dL to 120 mg/dL;
   xiii. Sodium—20 mg/dL to 60 mg/dL; and
   xiv. Zinc—0.25 mg/dL to 1.2 mg/dL.

15. Once the nutritional analysis was complete, a label was generated with the actual values from the lab. In general food procedures, an average is placed on the label. These PROLACTA™ products, however, show what was specifically in each bottle.

16. The product was shipped to customers in insulated coolers on dry ice. Cool blocks can also be used for shipping in lieu of dry ice.

EXAMPLE 5

Validation of the Pasteurization Methods

The methods and compositions of the disclosure maintain desirable activities of important proteins and vitamins in the described compositions and eliminate bioburden (see, e.g., Terpstra et al., Breastfeeding Med. 2(1):27-33, 2007).

A. Bioburden Validation

A validation of the effects of high-temperature short-time (HTST) pasteurization and vat pasteurization on the bioburden of human milk was carried out. The test organisms used in the validation studies were the following bacteria and viruses: *E. coli, S. aureus*, and *S. agalactiae*, human immunodeficiency virus (HIV), hepatitis A virus (HAV), bovine viral diarrhea virus (BVDV) and pseudorabies virus (PSR). HIV and HAV are known to be potential contaminants of human milk and were, therefore, selected as relevant viruses. Hepatitis C virus (HCV) is also known to be a potential contaminant of human milk. However, this virus cannot be cultured effectively in laboratory cell line systems so the specific model virus BVDV is used. For the same technical reason, hepatitis B virus (HBV), also a known potential contaminant of human milk, is substituted by the general model pseudorabies virus which, like HBV, is a lipid-enveloped virus. Using the methods described herein, the following results were obtained:

TABLE 2

$Log_{10}$ Reduction Values for Test Organisms

| Pathogen | $Log_{10}$ Reduction (HTST) | $Log_{10}$ Reduction (vat) |
| --- | --- | --- |
| *E. coli* | >32 | Not done |
| *S. aureus* | 15 | Not done |
| *S. agalactiae* | >26 | Not done |
| BVDVa | >5.84 | >6.1 |
| HIV | >7.27 | >6.7 |
| PSR | >7.68 | >6.8 |
| HAV | ~2 | ~1.7 |

These viral log reduction values do not represent the maximum reduction that can be achieved by the methods of the disclosure. Although *S. aureus* is fairly resistant to heat treatment, this organism showed a 15 log reduction with the process of the disclosure.

B. Validation of Milk Components

A validation of the level of various human milk components after pasteurization was also carried out.

Immunoglobulin A (IgA) and secretory IgA (s[IgA$_2$]) were quantitated in human milk samples using sandwich ELISA procedures. Following pasteurization using the HTST process featured herein, IgA concentration declined about 27% (e.g., a range of about 7% to about 47%), on average, and secretory IgA levels declined 17% (e.g., a range of about 7% to about 27%), on average, compared to the corresponding values in untreated human milk samples.

Lysozyme activity was determined by a microtiter assay using a *Micrococcus lysodeikticus* suspension as a substrate. The lysozyme activity in human milk after pasteurization was about 22,000 IU/mL, 57% (e.g., a range of about 47% to about 67% or more) of the initial activity (39,000 IU/mL) in raw human milk.

Lactoferrin concentration was determined by an ELISA technique. The lactoferrin content of human milk after pasteurization using the methods of the disclosure was about 0.033 g/100 mL, about 14% (e.g., a range of about 4-24%) of the initial concentration (0.24 g/100 mL) in raw human milk.

Vitamin analyses were performed by validated HPLC procedures. Vitamin A, vitamin C, and α-, γ-, and δ-tocopherol levels remained unchanged following pasteurization. The vitamin B6 content of human milk slightly decreased to about 7.8 µg/100 mL, about 89% of the initial concentration of 8.8 µg/100 mL. These results are presented in Table 3.

TABLE 3

| Constituent | Untreated Milk | Pasteurized Milk | % Remaining |
|---|---|---|---|
| Immunoglobulin A (mg/mL) | 315 | 230 | 73 |
| Secretory IgA (mg/mL) | 462 | 379 | 82 |
| Lysozyme (IU/mL) | 39,000 | 22,000 | 57 |
| Lactoferrin (g/100 mL) | 0.24 | 0.033 | 14 |
| Vitamin B6 (µg/100 mL) | 8.8 | 7.8 | 89 |

Effect of Pasteurization on Human Milk Constituents

Other variations and embodiments of the invention described herein will now be apparent to those of ordinary skill in the art without departing from the scope of the invention or the spirit of the claims below.

What is claimed is:

1. A pasteurized human milk composition comprising:
   a human protein constituent of about 55-95 mg/ml;
   a human fat constituent of about 85-95 mg/mL; and
   a human carbohydrate constituent of about 70-120 mg/mL.

2. The composition of claim 1, wherein the carbohydrate constituent comprises lactose.

3. The composition of claim 1, further comprising one or more constituents selected from the group consisting of: calcium, chloride, copper, iron, magnesium, manganese, phosphorus, potassium, sodium, and zinc.

4. The composition of claim 1, comprising:
   calcium concentration of about 4.0-5.5 mg/mL;
   chloride concentration of about 0.35-0.95 mg/mL;
   copper concentration of about 0.0005-0.0021 mg/mL;
   iron concentration of about 0.001-0.007 mg/mL;
   magnesium concentration of about 0.180-0.292 mg/mL;
   manganese concentration of about 0.010-0.092 micrograms/mL;
   phosphorus concentration of about 2.00-3.05 mg/mL;
   potassium concentration of about 1.90-2.18 mg/mL;
   sodium concentration of about 0.75-0.96 mg/mL; and
   zinc concentration of about 0.0200-0.0369 mg/mL.

5. The composition of claim 1, comprising:
   calcium concentration of about 2.00-2.90 mg/mL;
   chloride concentration of about 0.175-0.475 mg/mL;
   copper concentration of about 0.00025-0.001 mg/mL;
   iron concentration of about 0.0005-0.0025 mg/mL;
   magnesium concentration of about 0.090-0.170 mg/mL;
   manganese concentration of about 0.005-0.046 micrograms/mL;
   phosphorus concentration of about 1.00-1.50 mg/mL;
   potassium concentration of about 0.95-1.41 mg/mL;
   sodium concentration of about 0.375-0.608 mg/mL; and
   zinc concentration of about 0.010-0.0198 mg/mL.

* * * * *